April 19, 1932. L. G. NILSON 1,854,952

FLUID DYNAMOMETER

Filed May 17, 1929 2 Sheets-Sheet 1

Inventor:
Lars G. Nilson
by Charles E. Mullan
His Attorney.

April 19, 1932.   L. G. NILSON   1,854,952
FLUID DYNAMOMETER
Filed May 17, 1929   2 Sheets-Sheet 2
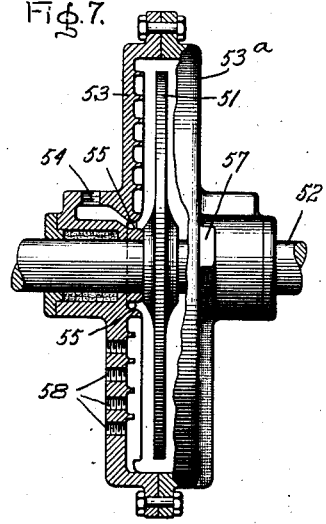
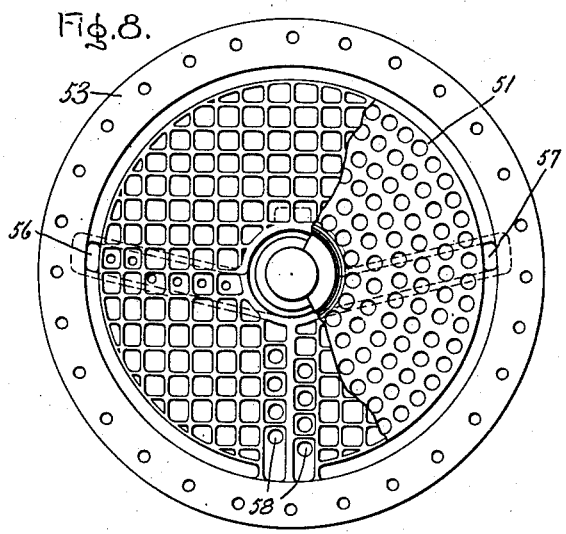
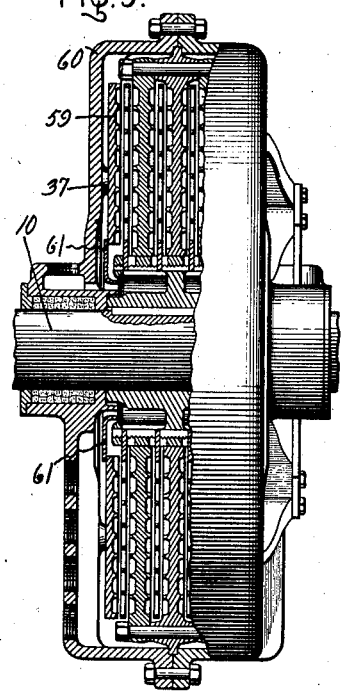
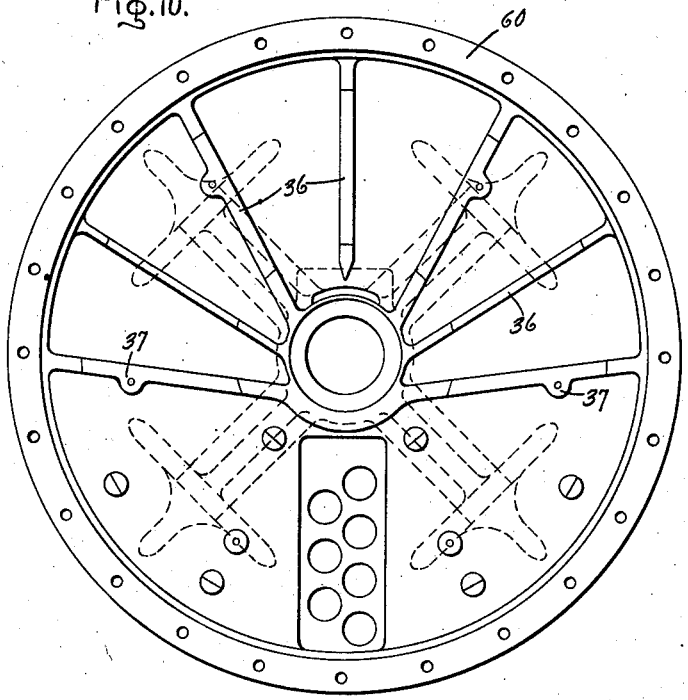
Inventor:
Lars G. Nilson,
by Charles E. Tullos
His Attorney Patented Apr. 19, 1932

1,854,952

UNITED STATES PATENT OFFICE

LARS G. NILSON, OF HOBOKEN, NEW JERSEY

FLUID DYNAMOMETER

Application filed May 17, 1929. Serial No. 363,903.

This invention relates to energy absorbing devices; more particularly to fluid dynamometers, and has for an object the provision of a simple, reliable and efficient device of the kind.

A further object of the invention is the provision of improvements for greatly increasing the efficiency and energy absorbing capacity of rotary hydraulic dynamometers such as described and claimed in my U. S. Patent 1,718,175, filed September 16, 1926, of which this invention is an improvement.

In carrying my invention into effect in one form thereof, I provide the stator plates with a plurality of raised portions in the form of a ribbed structure to present a roughened surface to the action of the fluid and thereby increase the energy absorption of the device, together with means for recirculating the fluid.

In illustrating my invention in one form thereof, I have shown it as embodied both in a single disk and in a multiple disk hydraulic dynamometer particularly designed for carrying out tests on high speed internal combustion engines; such, for example, as automobile and airplane engines and the like.

Figure 1:
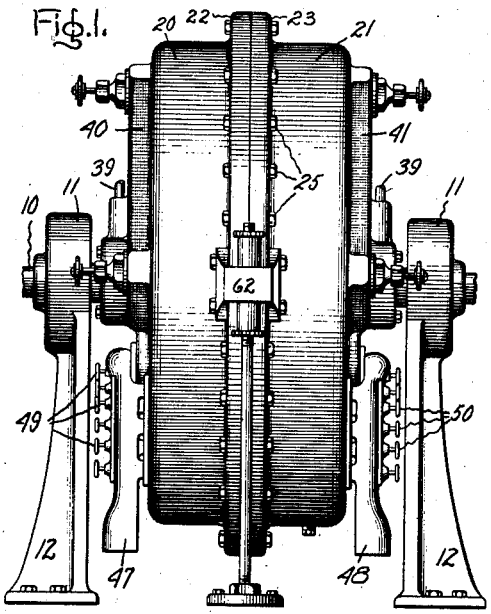
Figure 2:
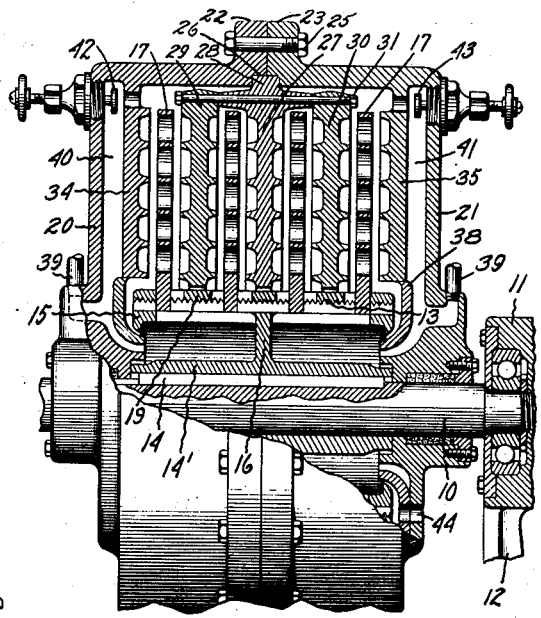
Figure 5:
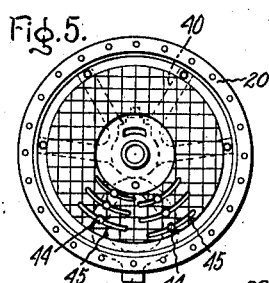
Figure 6:
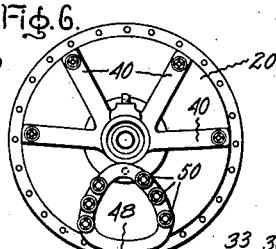
Figure 3:
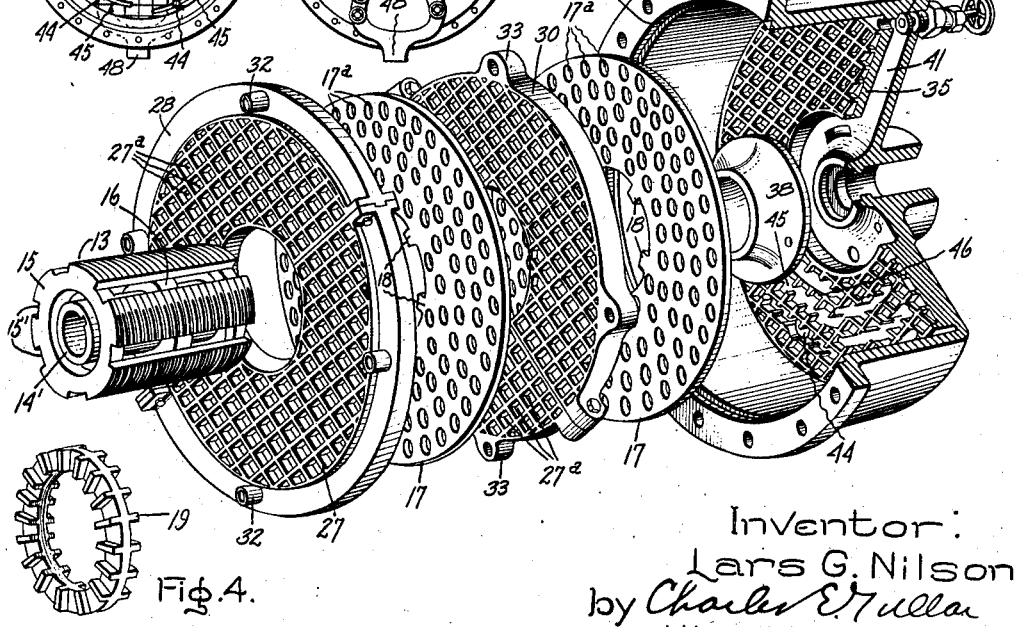
Figure 4:
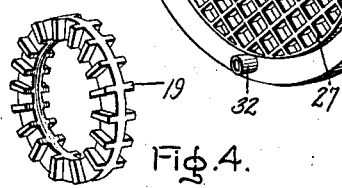

For a better and more complete understanding of the invention, reference should now be made to the following specification and to the accompanying drawings, in which Fig. 1 is a view in elevation of a fluid dynamometer embodying my invention; Fig. 2 is an enlarged elevation partly in section; Fig. 3 is an exploded view in perspective of the elements comprising the right hand half of the embodiment of the invention shown in Fig. 2; Fig. 4 is a detail; Figs. 5 and 6 are respectively front and rear views of an end plate forming a half of the stator housing; Fig. 7 is a view in elevation of a modification, partly in section; Fig. 8 is an inside view of the modification of Fig. 7 partly broken away; Fig. 9 is another modification; and Fig. 10 is an inside view of an end plate of the stator housing of the modification of Fig. 9.

Referring now to the drawings, a main shaft 10 carrying the rotating element is journaled in suitable bearings 11 which are mounted on the pedestals 12. A vented spider or drum 13 is mounted upon the shaft 10 and is secured to the shaft, so as to rotate therewith, by a key 14. As shown, the spider 13 consists of an inner sleeve portion 14' which fits snugly upon the shaft, and an outer, substantially concentric, cylindrical rim portion 15 which is spaced from the sleeve by a centrally disposed flanged partition 16; the parts 14', 15 and 16, as shown, being of integral construction. The rim portion of the spider is cut away at suitable intervals to provide longitudinal vents 15' to the interior space of the spider, i. e. the space between the sleeve and the rim, for the purpose of distributing the fluid to the interspacial regions of the dynamometer. A plurality of perforated circular disks 17, preferably annular in form, have inwardly projecting teeth 18 which fit snugly into the cut away portions or vents of the spider 13. The rim portion of the spider 13 is provided with a helical thread, as shown, to receive the threaded spacing nuts or collars 19 which serve to space and secure the disks 17 a desired distance apart from each other upon the spider 13.

This rotor comprising the disks 17 mounted on the shaft 10 is enclosed in a centrally divided stator housing formed by the two cylindrical cap members 20 and 21 suitably journaled upon the shaft 10. The two stator housing members 20 and 21 are provided with centrally disposed outwardly projecting annular flanges 22 and 23 which are tightly clamped together by any suitable fastening means, such as the bolts 25.

The stator housing members 20 and 21 which constitute the housing of the dynamometer are provided with an annular groove 26 on the interior surface of the wall of the housing, one half of which is located in each of the two members. A central imperforate stator plate 27 is provided with a circumferential tongue 28 which is machined to fit in the groove 26 whereby it is secured in the housing. This plate serves to support intermediate imperforate plates 29 and 30 which are secured to the central plate by suitable fastening means such as the bolts 31.

As shown in the drawings (Fig. 3) the central plate 27 is provided with bosses 32, and the intermediate plates 29 and 30 are provided with ears 33 through which pass the bolts 31. The bosses serve to space the central plate and the intermediate plates so that they occupy positions in the spaces between the rotor plates 17 which are mounted upon and carried by the spider 13.

The stator plates 27 and 30 are divided along a diameter into two parts, as is most clearly shown in Fig. 3, and these parts are secured together by suitable fastening means. The bosses 32 of the central plate 27 are located diametrically opposite each other upon a diameter of the plate, making an angle of appoximately 45 degrees with the diametrical division of the plate. Similarly the ears 33 on the intermediate plates 29 and 30 are located diametrically opposite each other upon diameters making an angle of substantially 45 degrees with the diameter along which the plate is divided into two portions.

When the plates are assembled the bosses and ears of the central and intermediate plates, respectively, are bolted together so that the diametrical divisions of these plates are angularly displaced substantially 90 degrees from each other. The construction just described and explained provides a self-contained, self-supporting stator member that may be easily assembled or taken apart.

As is most clearly illustrated in Figs. 2 and 3 of the drawings, the stator housing members 20 and 21 are provided with roughened or ribbed surfaces 34 and 35; the rib formation being the same as that on the central plate 27 and the intermediate plates 29 and 30.

Fluid inlets are provided in the stator housing at each end of the shaft and as shown in Figs. 2 and 3; each of these inlets consisting of an annular nozzle surrounding the shaft 10 formed by the inwardly extending flared annular nozzle plate 38 and the complementary wall of the stator housing to which the nozzle plate 38 may be secured by any suitable fastening means (not shown). As shown, the nozzles extend respectively into the spaces between the sleeve 14' and the rim 15 of the spider 13.

Fluid may be admitted to the nozzles by any suitable means, such as a hose or pipe 39, and it is directed by the nozzles into the spaces between the rim 15 and the sleeve 14 of the vented spider 13 with which the nozzles communicate. As stated before in this specification the rim 15 of the spider 13 is vented and these vents 15' serve to distribute the fluid to the spaces between the rotor disks 17 which are mounted upon the spider, and the stator plates which are supported by the stator housing.

The rotor disks 17 are provided with a plurality of perforations 17a clearly shown in Figs. 2 and 3, whilst the stator plates have a plurality of depressions or pockets 27a formed in their surfaces to provide the cross-ribbed structure most clearly shown in Fig. 3. Although the cross-ribbed structure shown is formed of a plurality of raised ribs intersecting each other at right angles to form squares, I would have it understood that other forms of ribbed surfaces may be employed. It is preferable, however, to employ the square cross-ribbed structure shown in the drawings for the purpose of simplifying the making of patterns and the moulding of the plates themselves. I have discovered that a marked and unexpected increase in the efficiency and in the energy absorbing capacity of the dynamometer results from the cross-ribbed structure of the stator plates above described.

Although it is not certain it is believed that in operation the water or other fluid distributed to the spaces between the rotating disks and the stationary plates is projected by centrifugal force outwardly through the vents, with which the spider 13 is provided, towards the periphery of the housing and that at the periphery the fluid forms a solid annulus. The friction between the water and the perforations of the rotor plates and the pockets and ribs of the stator plates heats the fluid to a very high temperature and it is by this means that the energy developed by a machine under test is absorbed by the dynamometer. The fluid may be heated to such a high degree that steam is formed, and in order that an even torque shall be developed by the dynamometer it is necessary under such conditions that the depth of the annulus of the fluid be carefully regulated and that steam pockets shall not be allowed to form anywhere within the housing.

In order to prevent the formation of steam pockets and the unsteady torque and violent fluctuations in the scale readings resulting therefrom, recirculating ducts are provided which serve to keep the temperature of the water practically uniform in the greater part of the interior of the housing. As shown in Figs. 1 and 2, radially extending recirculating ducts 40 and 41 are cored in the members 20 and 21 which form the housing member itself. Any suitable number of these ducts may be employed and as clearly shown in the drawings, they afford communication between points adjacent the periphery of the housing and the annular inlet nozzles which surround the shaft 10.

The depth of the annulus of the fluid in the housing may be controlled by restricting the flow of the fluid in the recirculating ducts 40 and 41 by any suitable means; such, for example, as by the manually operated valves 42 and 43 which are positioned in the housing at points near the periphery thereof. Although four of these recirculating ducts 40 are shown in the end plate 20 of the stator housing in Fig. 6, (the end plate 21 being preferably of identical construction) it will of course be understood by persons skilled in the art that a greater or a lesser number may be employed, depending upon the character of the machine or engine which will most usually and ordinarily be tested by the dynamometer, and upon the size of the dynamometer itself.

The depth of the annulus of the fluid within the casing may be further controlled by restricting the discharge of the fluid from the housing. On the lower part of each of the members 20 and 21 of the housing, a plurality of discharge ports 44 (Fig. 5) are cored through the walls thereof. These ports 44 are staggered at varying radial distances from the center of the housing as shown in Fig. 5. A plurality of curved arc-shaped slots 45 serve to direct the fluid into the discharge ports, but in order that the discharge shall not be too free, obstructions 46 are placed in these slots to impede the flow of the water by causing eddies to be created therein. It will be noted, however, that these obstructions 46 do not project as far from the lower surface of the slots as do the cross ribs of the plate.

The discharge ports 44 communicate with discharge manifolds 47 and 48 which are located on the outside of the stator housing members 20 and 21, and as shown, each of these manifolds is provided with a plurality of manually operated valves 49 and 50 for controlling the discharge of the fluid from the discharge orifices 44.

In the modification shown in Fig. 7 a single perforated disk 51 is mounted upon the rotor shaft 52 and the cross-ribbed plates are formed in the walls of the members 53 and 53ª forming the housing. Since but a single disk is employed in the dynamometer shown in this figure, the vented spider 13 of Figs. 2 and 3 becomes unnecessary; the fluid being led into the interior of the housing through the inlet port 54 and evenly distributed to the space between the disk 51 and the cross-ribbed walls of the housing by an annular groove 55 formed in each of the end plates 53 and 53ª so as to surround the shaft 52. As in the modification previously described, the temperature of the fluid within the casing may be maintained constant by recirculating a portion of the fluid within the casing; and to accomplish this purpose a plurality of recirculating ducts 56 and 57 (Fig. 8) are cored in the body of the stator housing members 53 and 53ª. These ducts extend from points near the periphery of the stator housing members to the annular distributing groove 55, and thus serve to return a portion of the fluid from the periphery of the casing to the center thereof, to provide for recirculation.

The depth of the annulus of the fluid is controlled by a plurality of discharge orifices 58 provided in the lower part of the housing and staggered at different radial distances from the center thereof. Threaded plugs (not shown) are screwed into all of the orifices 58, except that one into which the discharge pipe or hose is threaded. The discharge orifice into which the discharge pipe or hose is screwed, determines the depth of the annulus of the fluid within the casing.

As shown in Figs. 9 and 10, it is not necessary that the recirculating ducts of the multiple disk type of dynamometer be formed in the walls of the stator housing, but they may be formed by the ribs 36 which serve to space the stator plates 59 from the casing 60 of the dynamometer. In this form of my invention the inside stator plates are formed as separate plates which are suitably secured as by studs or bolts screwed into the threaded bosses 37 with which ribs 36 are provided. It should also be pointed out that although the flared annular nozzle plates 38 of Figs. 2 and 3 and the nozzle plates 61 of the modification of Fig. 9 are shown as separate plates secured to the housing by fastening means, they might be formed integrally with the housing itself.

In operation the engine, motor, or other device the torque or characteristic of which it is desired to determine is coupled to one end of the shaft 10. The stator of the dynamometer is balanced and is engaged with any suitable force measuring device such as a scale, through the medium of stator block 62. Connections for the supply fluid are made (preferably through the medium of a flexible hose) to the intake pipe 39 at each end of the stator; and one or more of the discharge ports 44 is connected to a drainage system by opening one or more of the manually controlled valves 49 and 50 in the discharge manifold 48. When the engine under test is started, the shaft 10 and likewise the rotor element of the dynamometer rotate. The resultant torque existing between the stator and rotor members of the dynamometer will be very small, being due only to the bearing friction and the air friction between the rotor and stator plates. When a suitable fluid, such, for example, as water, a heavy oil, or mercury is introduced into the interior of the vented spider 13 the centrifugal action will tend to distribute the fluid through the vents in the rim of the spider and into the spaces between the rotor disks and the stator plates to the periphery of the stator housing, where it forms an annulus maintained by the rotation of the rotor disks.

The presence of the fluid in the interspacial portions of the dynamometer rotor and stator elements results in a frictional resistance to the motion of the rotor element and causes a torque to exist between the stator element and the rotor element which may be measured by a scale mechanism (not shown) connected to one of the casing blocks 62. As will be understood, the value of this torque is a function involving the friction between the rotor disks and the fluid, the shearing action of the fluid acting at the edges of the rotor disk perforations and the eddies produced in the fluid by the cross-ribbed surfaces of the stator housing.

It will be clear that the centrally disposed flanged partition 16 of vented spider 13 makes possible the operation of the dynamometer at half capacity by the simple expedient of restricting the supply of fluid to one end of the spider, thereby restricting the distribution of fluid either to one side or the other of the central stator plate 27.

The amount of energy that is absorbed by the dynamometer may be more closely controlled by regulating the quantity of fluid admitted to the interior of the housing through the annular inlet nozzles, or the discharge of fluid from the casing may be restricted by operation of one or more of the valves 49 in the discharge manifold 48. A solid annulus of fluid is thus built up in the casing to the desired depth; just sufficient fluid being permitted to enter the casing and escape therefrom to keep the temperature within the desired limits.

Although in accordance with the provisions of the patent statutes I have disclosed and explained the best forms of the invention now known to me, I would have it understood that the invention is not limited to the exact forms illustrated, since modifications and alterations will readily suggest themselves to persons skilled in the art without departing from the true spirit of my invention or from the scope of the annexed claims.

What I claim as new and desire to secure by Letters Patent of the United States, is,—

1. A fluid dynamometer comprising relatively movable members arranged in spaced relation, one of said members being provided with a roughened surface adjacent the other member said roughened surface being formed by intersecting ribs, and means for directing a fluid between said members.

2. In combination in a fluid dynamometer, a rotor member comprising a rotatable shaft having a disk mounted thereon, and a stator member having a surface adjacent the surface of said disk; the surface of one of said members being provided with a series of depressions formed by intersecting ribs.

3. In combination in a fluid dynamometer, a rotor member comprising a rotatable shaft having a disk mounted thereon, and a stator member comprising a housing having a roughened inwardly disposed surface formed by intersecting ribs adjacent one side of said disk.

4. In an hydraulic dynamometer the combination with a rotatable shaft having a perforated disk attached thereto, of a housing member having an interior surface provided with a plurality of pockets adjacent one side of said disk.

5. An hydraulic dynamometer comprising in combination a rotatable shaft having a perforated disk attached thereto, a housing member having its interior surface provided with a ridged formation adjacent one side of said disk, and means comprising a nozzle for supplying a fluid to the space between said housing member and said disk.

6. An energy absorbing device comprising a rotatable shaft provided with an attached disk, a housing member provided with a ridged interior surface adjacent a side surface of said disk, means comprising a nozzle having an annular orifice surrounding said shaft for supplying a fluid to the space between said disk and said housing; said housing being provided with a recirculating duct extending from the periphery to the center thereof.

7. In a dynamometer, a rotor member comprising a shaft and a disk mounted thereon, a housing member having its interior surface provided with a plurality of projections spaced from said disk, an annular nozzle in said housing surrounding said shaft, said housing being provided with a plurality of ducts extending from the periphery thereof to said nozzle for recirculating the fluid from said space to said nozzle, and provided with a plurality of discharge orifices arranged at different radial distances from said shaft.

8. In an hydraulic dynamometer, the combination with a rotor member comprising a shaft with attached disks, of a stator member comprising a housing and a plurality of plates having roughened surfaces formed by intersecting ribs opposed to and spaced from said disks, and means including a nozzle in said housing for supplying a fluid to the spaces between said plates and said disks.

9. In an hydraulic dynamometer the combination with a shaft having a plurality of attached disks, of a housing member provided with a plurality of plates having roughened surfaces formed by intersecting ribs spaced from and opposed to the surfaces of said disks, means for supplying a fluid to said dynamometer, and a vented spider mounted on said shaft for distributing said fluid uniformly to the spaces between said plates and said disks.

10. In a dynamometer, a rotor member comprising a shaft and a plurality of disks mounted on said shaft, a housing member provided with a plurality of plates having ribbed surfaces spaced from and opposed to said disks, means for supplying a fluid to said dynamometer comprising nozzles located in said housing at opposite ends of said shaft, and a vented spider mounted on said shaft and communicating with said nozzles for distributing said fluid uniformly to the space between said plates and said housing, said spider having a centrally located flanged partition to permit of the use of one half only of said dynamometer.

11. In an hydraulic dynamometer, a rotor member comprising a shaft and a plurality of disks mounted thereon, a circular shaped housing member provided with a plurality of ribbed disks spaced from and opposed to said annular orifice surrounding said shaft for supplying a fluid to said dynamometer, and a vented spider mounted on said shaft for receiving the flow from said nozzles and distributing the fluid uniformly to the spaces between said plates and said disks; said housing being provided with a plurality of passages extending from points adjacent the periphery of said dynamometer to said orifices to provide for recirculation of a portion of said fluid.

12. In an hydraulic dynamometer, a rotor comprising a plurality of disks, a stator provided with a plurality of plates having recessed portions to provide roughened surfaces opposed to said disks, an inlet means for admitting a fluid to said dynamometer at points near the axis of the rotor, and means for returning a portion of said fluid from a point adjacent the periphery of said stator to said inlet to provide for recirculation of the fluid.

13. In an absorption dynamometer a rotor having a plurality of attached disks, a stator comprising a housing and a plurality of cross rib surfaced plates opposed and spaced from said disks, inlet means for admitting a fluid to said dynamometer at a point near the centers of the disks and means affording communication between points adjacent the periphery of said housing and said inlet to provide for recirculation of a portion of said fluid.

14. An energy absorbing device comprising a rotor having a plurality of spaced disks, a stator comprising a housing provided with a plurality of plates spaced from said disks, means for supplying a fluid to said device at a point near the center of said rotor, and means including a passage formed in the wall of said housing affording communication between a point adjacent the periphery of said housing and said supplying means to provide for recirculation of the fluid in said device.

15. In an energy absorbing device the combination with a rotor comprising a shaft having a plurality of spaced disks mounted thereon, of a stator comprising a housing provided with a plurality of plates spaced from said disks, means including an annular orifice formed in the wall of said housing surrounding said shaft for supplying fluid between said plates and disks, and means including a passage formed entirely in the wall of said housing affording communication between a point adjacent the periphery of said housing and said annular orifice to provide for recirculation of the fluid of said device.

16. In an hydraulic dynamometer the combination with a stator provided with a plurality of spaced plates, one of said plates being imperforate, and an inlet means for admitting a fluid thereto, of a rotor comprising a shaft having a plurality of disks mounted thereon and spaced between said plates, and a vented spider mounted on said shaft and communicating with said inlet means for distributing the fluid uniformly to the spaces between said disks and said plates; said vented spider being provided with a central partition to restrict the distribution of the fluid to one side of said imperforate plate.

17. In an hydraulic dynamometer, a stator member comprising a housing provided with a plurality of spaced plates, a rotatable shaft journaled in said housing, a plurality of disks mounted on said shaft for rotation in the spaces between said plates, means for admitting a fluid to said dynamometer, means comprising a passage formed in said housing affording communication between points adjacent the periphery of said housing and said fluid admitting means to provide for recirculation of a portion of said fluid, and means for controlling the flow of fluid in said passage.

18. In an hydraulic dynamometer the combination with a rotor comprising a shaft having a plurality of spaced disks mounted thereon, of a stator comprising a housing provided with a plurality of plates spaced from and opposed to said disks, means for admitting a fluid to the spaces between said plates and disks, and means comprising a plurality of ports formed in the wall of said housing at different radial distances from said shaft for discharging fluid from said dynamometer, and a manifold provided with a plurality of valves for controlling the discharge of fluid through said ports.

19. In a device of the character described, a circular shaped stator housing having an interiorly disposed annular groove formed in its wall, a plate provided at its periphery with a tongue adapted to fit in said groove, and a plurality of plates secured to said first-mentioned plate.

20. In a fluid dynamometer the combination with a rotor comprising a shaft provided with a plurality of spaced plates, of a stator comprising a housing having a circumferential groove formed in its wall on the inner surface thereof, a central plate having a circular shaped tongue adapted to fit in said groove, a plurality of intermediate plates, (means for securing said intermediate plates to said central plate) and means including bosses on said central plate for spacing said plates to occupy positions in the spaces between said disks.

In witness whereof, I have hereunto set my hand this 15th day of May, 1929.

LARS G. NILSON.